July 5, 1960
C. THUMIM
2,943,506
CRANK DRIVE FOR PAPER CUTTER KNIVES
Filed May 24, 1957
2 Sheets-Sheet 1
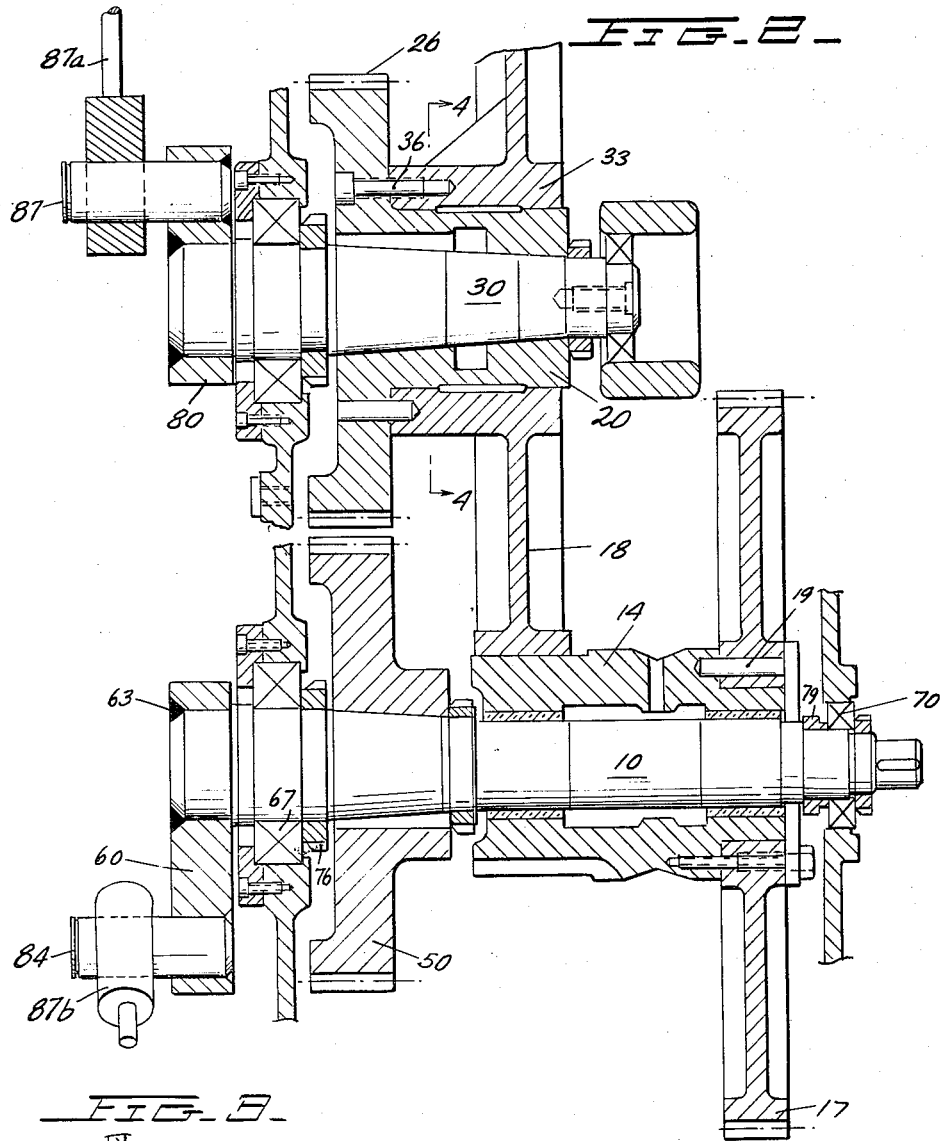
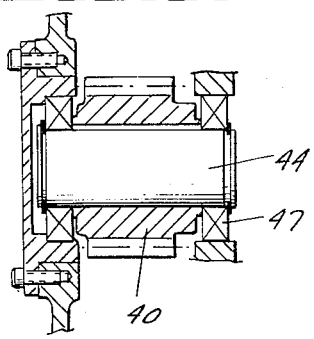
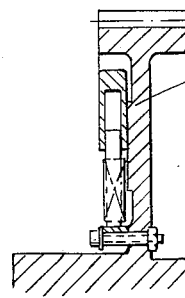
INVENTOR.
CARL THUMIM
BY
ATTORNEYS July 5, 1960

C. THUMIM 2,943,506

CRANK DRIVE FOR PAPER CUTTER KNIVES

Filed May 24, 1957

INVENTOR.
CARL THUMIM
BY
ATTORNEYS

United States Patent Office 2,943,506
Patented July 5, 1960

---

2,943,506

CRANK DRIVE FOR PAPER CUTTER KNIVES

Carl Thumim, Westbury, N.Y., assignor to E. P. Lawson Co., Inc., New York, N.Y., a corporation of New York Filed May 24, 1957, Ser. No. 661,534

2 Claims. (Cl. 74—414)

This invention relates to paper cutters and more particularly to knife drives therefor.

It is an object of the invention to provide a drive for a paper cutter knife which effects a pull at both ends of the knife in unison at a proportional rate to eliminate wobbling of the knife bar in a vertical plane and to produce smooth cutting results.

It is another object of the invention to provide a knife bar pull mechanism which is simple, effective and rugged.

It is a still further object of the invention to provide a knife bar pull mechanism which effects the economy of utilizing simple and easily manufactured mechanical components.

Briefly, my invention comprises a mechanism having a crank pin for pulling each pull bar wherein the crank pins are of different fixed length to provide a proportional rate of pull on respective bars and wherein the crank pins are driven by gears of identical size at the same angular rate.

A detailed description of my invention will now be given in conjunction with the appended drawings in which:

Figure 2 is a section through 2—2 of Figure 1.

Figure 3 is a section through 3—3 of Figure 1.

Figure 5 is a section through 5—5 of Figure 4.

Figure 1:
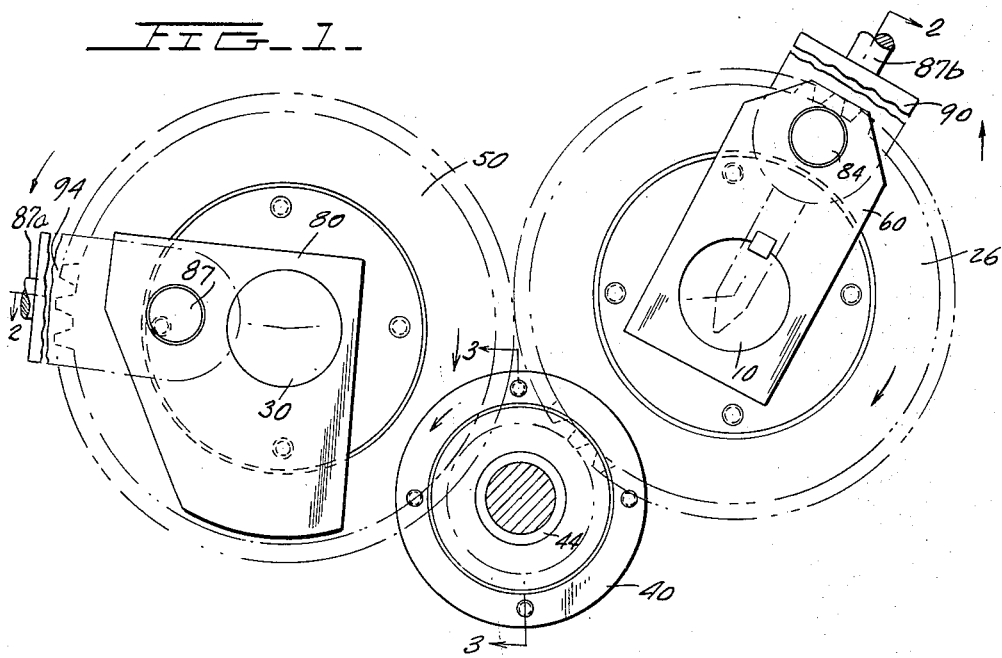
Figure 1 is an elevation showing the arrangement of the pull bar driving gears and an idler.
Figure 4:
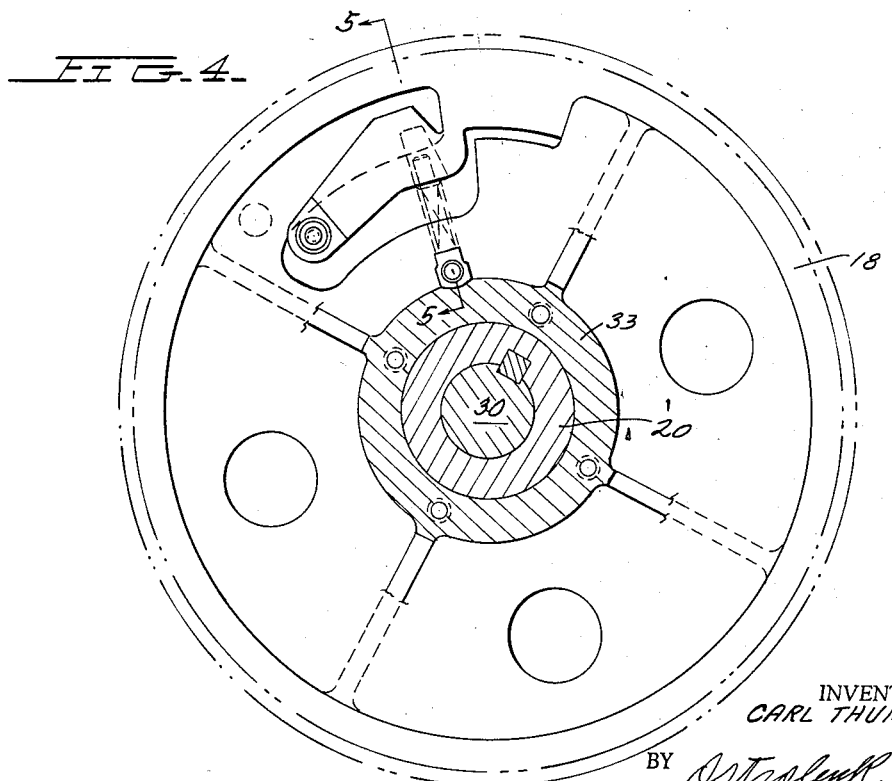
Figure 4 is a section through 4—4 of Figure 2.

Referring now to Figures 1–3, the invention comprises a crank shaft 10 on which is rotatively mounted a pinion 14 to which is keyed a gear 17 as by bolts such as 19, which gear will be understood to be driven by a high speed pinion operated by the motor of the machine through a clutch-brake arrangement substantially as shown in my co-pending application Serial No. 660,795, filed May 22, 1957. The pinion 14 meshes with and drives a gear 18 which is carried on a hub 20 of a gear 26. The hub 20 is rotatively carried on a second crank shaft 30. Gear 18 has a hub 33 secured as by bolts such as 36 to the gear 26.

The gear 26 meshes with an idler pinion 40 carried on a shaft 44 in suitable bearings such as 47 which will be understood to be suitably mounted in the frame of the machine.

Pinion 40 meshes with a crank gear 50 identical with gear 26. Gear 50 is keyed to crank shaft 10 as shown while crank gear 26 is keyed to crank shaft 30 as shown.

From the foregoing description it will be apparent that rotation of gear 17 effects rotation of hub pinion 14 to rotate gear 18, thus rotating gear 26 which in turn rotates idler 40, which idler rotates gear 50. Thus, the crank shafts 10 and 30 are rotated at the same angular rate and in the same direction, it being noted that gears 26 and 50 are identical gears.

Crank shaft 10 carries a crank arm 60 welded thereto at 63, suitable bearing support for the crank shaft being effected by the bearings 67 in the crank arm end and by the bearing 70 at its other end. It will be understood that the bearings 67 and 70 are suitably mounted in the machine frame. A take-up collar 76 carried in crank shaft 10 locates the crank shaft with respect to the bearing at that end and a spacer collar 79 is utilized at the other end as shown in abutment with bearing 70 so that the crank shaft is precisely located with respect to the machine frame.

The crank shaft 30 has welded thereto a crank arm 80, and it will be understood that the crank shaft is suitably mounted in bearings as shown having locating collars to maintain proper axial position of the crank shaft with respect to the machine.

Each crank arm carries a crank pin; thus, arm 60 carries the crank pin 84 and arm 80 carries the crank pin 87. The phasing of the crank pins is such as to pull down each end of the knife bar at a proper proportional rate, it being understood that suitable pull bars 87a, 87b connect respective crank pins with respective knife bar ends in a manner heretofore known or as shown in a novel manner disclosed in my co-pending application Serial No. 669,608, filed July 2, 1957.

The lengths of the crank arms represent a fixed ratio and inasmuch as they rotate at the same angular speed driven by identical gears and in the same direction, it will be apparent that the two ends of the knife bar will be driven downwardly at a definite proportional rate. This follows even though one crank pin may be connected directly through a pull bar 90 to one end of the knife bar while the other crank pin actuates a pull bar 94 acting through a bell crank (not shown) connected to the other end of the knife bar (not shown).

Having thus described my invention, I am aware that various changes may be made without departing from the spirit thereof, and accordingly I do not seek to be limited to the precise illustration herein given except as set forth in the appended claims.

I claim:

1. In a mechanism for driving the ends of a knife bar at a uniformly proportional rate comprising a pair of crank shafts in parallel relationship, a gear keyed to each shaft, said gears being identical, a power driven pinion on one of said shafts and rotative with respect thereto, a gear on the other of said shafts meshed with said power driven pinion and secured to the gear on said other shaft, an idler gear in mesh with said latter gear and with the gear on said one crank shaft and a crank pin carried for rotation by each of said crank shafts.

2. In a mechanism as set forth in claim 1, said crank pins being carried at respective fixed distances from the axes of rotation of respective crank shafts.

References Cited in the file of this patent

UNITED STATES PATENTS

| | | |
|---|---|---|
| 366,125 | Noyes | July 15, 1887 |
| 581,417 | Feister | Apr. 27, 1897 |
| 1,710,084 | Berry | Apr. 23, 1929 |
| 1,986,685 | Soderberg | Jan. 1, 1935 |